Figure 1:
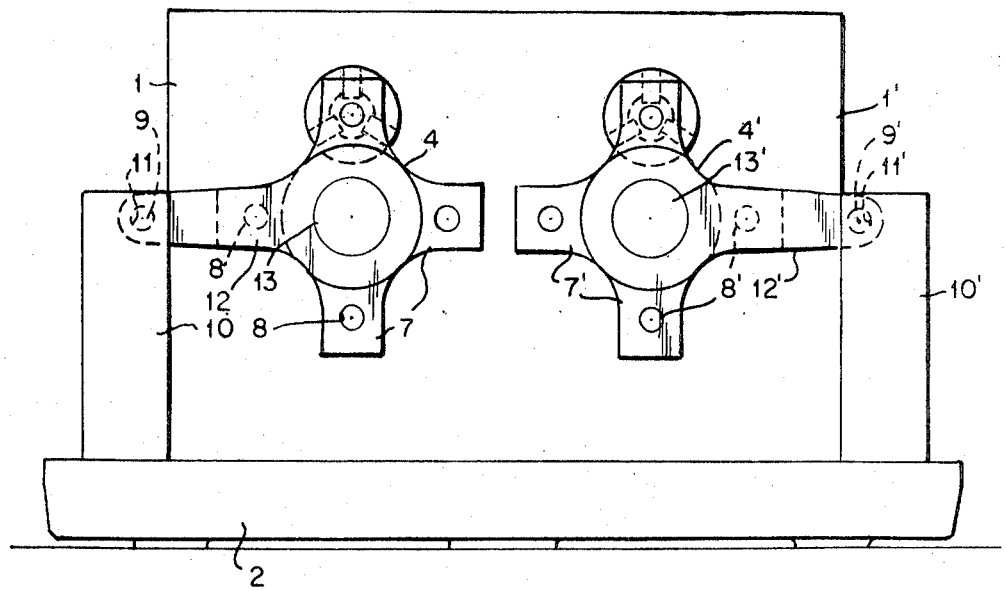

United States Patent
Reiners et al.

[15] 3,643,533
[45] Feb. 22, 1972

[54] TURRET LATHE

[72] Inventors: Franz Reiners, Post Berg/Erkelenz-land; Georg Walk, Rheydt, both of Germany

[73] Assignee: A. Monforts, Monchengladbach, Germany

[22] Filed: Dec. 1, 1969

[21] Appl. No.: 881,216

[30] Foreign Application Priority Data

Nov. 30, 1968 Germany ............... P 18 11 958.9

[52] U.S. Cl. ................... 82/36 A, 82/3, 82/21 R, 29/43, 74/826
[51] Int. Cl. ..................................... B23b 29/30
[58] Field of Search ............... 82/36 A, 3, 21 A, 21 B; 29/42, 29/43; 74/826

[56] References Cited

UNITED STATES PATENTS 2,783,526  3/1957  Johnson .................. 82/36 A
3,301,106  1/1967  LeBrusque .............. 82/36 A

FOREIGN PATENTS OR APPLICATIONS 400,720  10/1965  Switzerland ............. 82/21

Primary Examiner—Leonidas Vlachos
Attorney—Curt M. Avery, Arthur E. Wilfond, Herbert L. Lerner and Daniel J. Tick

[57] ABSTRACT

Turret lathe includes a multiarmed tool turret rotatably adjustable to at least two angular positions, and indexing arm carried by the tool turret for indexing the tool turret in each of the angular positions thereof, the indexing arm being formed with an indexing bore, and an indexing pin continuously extending through the indexing bore for uninterruptedly holding the indexing arm against rotation with the rotatable tool turret.

4 Claims, 2 Drawing Figures

TURRET LATHE

Our invention relates to a turret lathe and more particularly, to a turret lathe having a multiarmed tool turret revolvable into at least two angular positions and which is capable of being indexed by an indexing pin extending parallel to the axis of the turret and receivable in an indexing bore.

In such lathes, it is necessary to index the tool turret in the various angular positions so as to be able thereby to achieve a high machining accuracy and good reproducibility.

To meet these requirements, it has been known heretofore to undertake the indexing of the multiarmed turret by means of a pin fixedly disposed on the frame of the lathe and which is directly brought into engagement in respective indexing bores formed in the turret arms. (German Pat. No. 906,105).

Generally, there has been a striving to construct tool machines as units which can be usable both independently as well as in assembly with other identical or different structural units in a very large installation. When combining two of the aforedescribed turret lathes into a double-spindled lathe with two tool turrets, the relatively large diameter of the turret has a disadvantageous effect in that the two working spindles must lie far away from one another due to the fact that the turret requires a minimum spacing to permit contact-free indexing or shifting thereof. Resulting therefrom are the relatively large working width dimensions and a reduced accessibility to the lathe chuck.

It would have been obvious to relocate the indexing pins so that they would extend in direction of the turret axis; however, the machining accuracy of the lathe would then be impaired, and insufficient space for mounting the tools would remain on the turret arms.

A further possible solution would have consisted in relocating the indexing in the lathe housing; but because an axial relocation of indexing and machining locations would then result, the turret axis would be undesirably subjected to torsion.

It is accordingly an object of our invention to provide a single turret lathe wherein the heretofore attainable high degree of working accuracy and the adequate space at the turret arms available for mounting the tools thereon are maintained, while that turret lathe is combinable with another such turret lathe into a double-spindled unit with reduced working width dimensions, good accessibility to the lathe chuck and relatively simple servicing being simultaneously afforded.

With the foregoing and other objects in view, we provide, in accordance with our invention, turret lathe comprising a multiarmed tool turret rotatably adjustable to at least two angular positions, an indexing arm carried by the tool turret for indexing the tool turret in each of the angular positions thereof, the indexing bore, and an indexing pin continuously extending through the indexing bore for holding the indexing arm uninterruptedly against rotation with the rotatable tool turret.

By forming the indexing bore in the indexing arm, the turret arms can be shortened a suitable distance so that the effective length of the turret arms for the tools is maintained in spite of the reduction in the turret diameter; especially, due to the fact that the indexing pin, as viewed in the axial direction thereof, is disposed directly in the vicinity of the working spindle, torsion of the turret shaft is avoided. Since the indexing pin is continuously inserted in the indexing bore and is no longer required to be withdrawn therefrom, wear of the pin or the surface of the bore is thereby minimized and a salutary effect is thereby attained with regard to the machining accuracy of the lathe.

By reducing the turret diameter, according to a further feature of our invention, we are able to combine two lathes of the foregoing construction into a double-spindled unit with reduced width dimensions and relatively good accessibility to the lathe chucks.

In accordance with another feature of our invention, we provide turret lathe wherein the indexing arm extends horizontally in direction laterally toward the indexing pin which is mounted in the lathe frame outside the region swept by the rotary turret. This feature avoids unnecessary limitation or confinement of the working space in the vicinity of the working spindle which would otherwise aggravate servicing of the lathe; due to maintenance of the position of the indexing pin relatively far beyond the turret rotary path or the region swept by the turret, a relatively high machining accuracy is assured.

According to an additional feature of our invention, we provide clutch means disposed coaxially to the turret for effecting clutching engagement between the turret and the indexing arm, one of which is formed with a cylinder chamber and the other of which is formed with a piston portion received in the cylinder chamber, and we further provide means for applying a pressure medium to the cylinder chamber for actuating the piston to effect relative displacement between the turret and the indexing arm and thereby bring the clutch means into and out of engagement. Due to this construction of the clutch means, the indexing arm can maintain the same angular position for all angular settings of the turret. Because of the actuation of the clutch means by the pressure medium, a virtually rigid connection of the indexing arm and the tool turret is attained.

In order to improve further the machining accuracy, which has already been promoted by the actuation of the clutch means by the pressure medium, we provide in accordance with another feature of our invention, clutch means having a sturdy and wear-resistant construction in the form of crown gears disposed on the turret shaft and the indexing arm.

By coupling the turret lathe of our invention with a second such turret lathe having the structure of a mirror-image thereof located at the side thereof opposite the side at which the indexing pin is located, there is thus afforded, in accordance with an added feature of our invention, the union of two lathes of the aforementioned structure into a double-spindled unit having reduced width dimensions and a relatively good accessibility to the lathe chucks.

Other features which are considered as characteristic for the invention are set forth in the appended claims.

Although the invention is illustrated and described herein as embodied in turret lathe, it is nevertheless not intended to be limited to the details shown, since various modifications and structural changes may be made therein without departing from the spirit of the invention and within the scope and range of equivalents of the claims.

Figure 2:
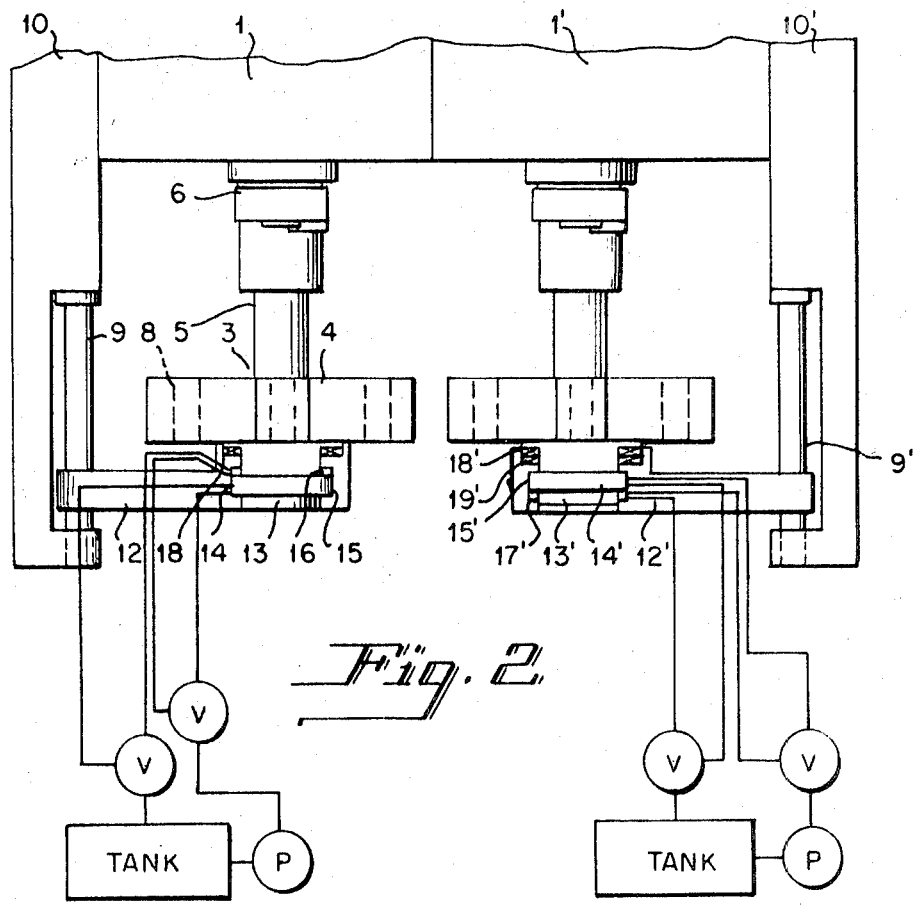

The construction and method of operation of the invention, however, together with additional objects and advantages thereof will be best understood from the following description of specific embodiments when read in connection with the accompanying drawing, in which:

FIG. 1 is a front elevational view of the double-spindled turret lathe unit constructed in accordance with our invention; and FIG. 2 is a top plan view of FIG. 1.

Referring now to the drawing, there is shown a double-spindled turret lathe unit formed of two independently driven turret lathes 1 and 1' of mirror-image construction and abutting at adjacent lateral surfaces, the lathes 1 and 1' being anchored on a common machine base 2. Each of the two turret lathes 1 and 1' has a respective multiarmed tool turret 3 and 3', with respective turret crosses 4 and 4' and turret shafts 5 and 5' which extend parallel to respective working spindles 6 and 6' in the respective spindle stocks of the lathes 1 and 1'. The turret cross 4, 4' is of multiarmed construction (four arms 7, 7' in the illustrated embodiment), each of the arms 7, 7' being formed with bores 8, 8' for receiving therein nonillustrated lathe tools or tool holders.

The tool turret 3, 3' is axially displaceable and is adjustable to four angular positions or settings corresponding to the turret arms 7, 7'. Indexing of the tool turret 3, 3' in these angular settings is effected by a fixed indexing pin 9, 9', extending parallel to the respective turret shaft 5, 5' and mounted on a lateral stand 10, 10' at the outside of the frame of the lathes 1, 1' and located beyond the rotary path or region swept by the turret cross 4, 4'.

The connection between the respective indexing pin 9, 9' and the tool turret 3, 3' is effected through a horizontally extending indexing arm 12, 12' formed with an indexing bore 11, 11' through which the indexing pin 9, 9' extends, continuously.

The respective tool turret 3, 3' is provided with a hub 13, 13' extending coaxially to the respective turret shaft 5, 5' and formed with a collar 14, 14'. The indexing arm 12, 12' has a cylindrical structure in the part thereof located in the vicinity of the turret shaft 5, 5', and is displaceably mounted on the hub 13, 13'. An annular groove 15, 15' is formed on the interior of the cylindrical part of the indexing arm 12, 12' and is wider than the collar 14, 14' of the turret shaft hub 13, 13' which is received therein. Thus, depending upon the axial location of the collar 14, 14', an annular chamber 16 or 17 is formed in the annular groove 15, 15'. A pressure medium is selectively supplied to the chambers 16 and 17, as shown schematically, in order to displace the indexing arm 12, 12' relative to the tool turret 3, 3' so as to thereby effect a coupling or uncoupling of the indexing arm 12, 12' and the tool turret 3, 3' in the axial direction thereof. Of course, it is also possible to have the cylindrical portion of the indexing arm 12, 12' formed with the collar, which would then be received in an annular chamber formed in the tool turret 3, 3'.

The indexing of the tool turret 3, 3' in the circumferential direction, is effected by a crown gear 18, 18' which is provided thereon. The crown gear 18, 18' is brought into meshing engagement with a corresponding crown gear 19, 19' provided on the indexing arm 12, 12' when the chamber 16, 16' is subjected to the pressure medium and the indexing arm 12, 12' is accordingly relatively displaced in direction toward the tool turret 3, 3'.

In FIG. 2, the indexing arm 12 and the tool turret 3 of the left-hand lathe 1, are shown in coupled condition, i.e., with the clutch members or gears 18, 19 intermeshed. The respective indexing arm 12, 12' remains coupled with the tool turret 3, 3' during the entire machining operation taking place in a specific angular position or setting of the tool turret 3, 3'.

When the machining operation in this angular setting of the tool turret 3, 3' is completed, the machining operation is changed with the indexing arm 12. Thus, the chamber 16, 16', theretofore subjected to pressure is connected to a discharge duct and the theretofore pressureless chamber 17, 17' is supplied with a pressure medium. The indexing arm 12, 12' is thus displaced relative to the tool turret 3, 3' so that the crown gear 18, 18' at the turret 3, 3' and 19, 19' at the indexing arm 12, 12' are disengaged. In FIG. 2, the indexing arm 12' and the tool turret 3' of the right-hand lathe are shown in uncoupled or disengaged condition. In this uncoupled condition, the tool turret 3' can be adjusted to the subsequent angular setting. The chamber 17' is connected to a discharge duct and the chamber 16' is again subjected to the pressure medium. By relatively displacing the indexing arm 12' in direction toward the tool turret 3', the crown gears 18' and 19' are mutually engaged so that the tool turret 3' is coupled axially with the indexing arm 12' and thereby indexed in circumferential direction by the indexing pin 9'.

Although the advantages of our invention are especially realized with the aforedescribed double-spindled turret lathe unit, it should be noted that our invention is also applicable to single-spindle turret lathes.

We claim:

1. Turret lathe comprising a multiarmed tool turret rotatably adjustable to at least two angular positions, an indexing arm carried by said tool turret for indexing said tool turret in each of said angular positions thereof, said indexing arm being formed with an indexing bore, an indexing pin continuously extending through said indexing bore for holding said indexing arm uninterruptedly against rotation with said rotatable tool turret, said indexing pin being mounted in the frame of the lathe outside the region swept by said rotary turret, said indexing arm extending horizontally from said turret in direction laterally toward said indexing pin, clutch means disposed coaxially to said turret for effecting clutching engagement between said turret and said indexing arm, one of said turret and said indexing arm being formed with a cylinder chamber and the other thereof being formed with a piston portion received in said cylinder chamber, and means for applying a pressure medium to said cylinder chamber for actuating said piston to effect relative displacement between said turret and said indexing arm and thereby to bring said clutch means into and out of engagement.

2. Turret lathe according to claim 1, wherein said clutch means comprises intermeshing crown gears formed respectively on said turret and said indexing arm.

3. Turret lathe according to claim 1, wherein said turret is mounted on a turret shaft, said clutch means comprising intermeshing crown gears formed respectively on said turret shaft and said indexing arm.

4. Turret lathe according to claim 1, in combination with a second turret lathe according to claim 2, having a construction that is a mirror-image of the first-mentioned turret lathe, both said lathes being disposed adjacent one another at a side thereof located opposite the side at which the respective indexing pin is located.

* * * * *